April 2, 1929.  J. R. DOUGLAS  1,707,657
LIQUID METER DEVICE FOR TANK TRUCKS
Filed Dec. 7, 1925  2 Sheets-Sheet 1

Inventor
James R. Douglas,
By Lyon & Lyon
Attorneys

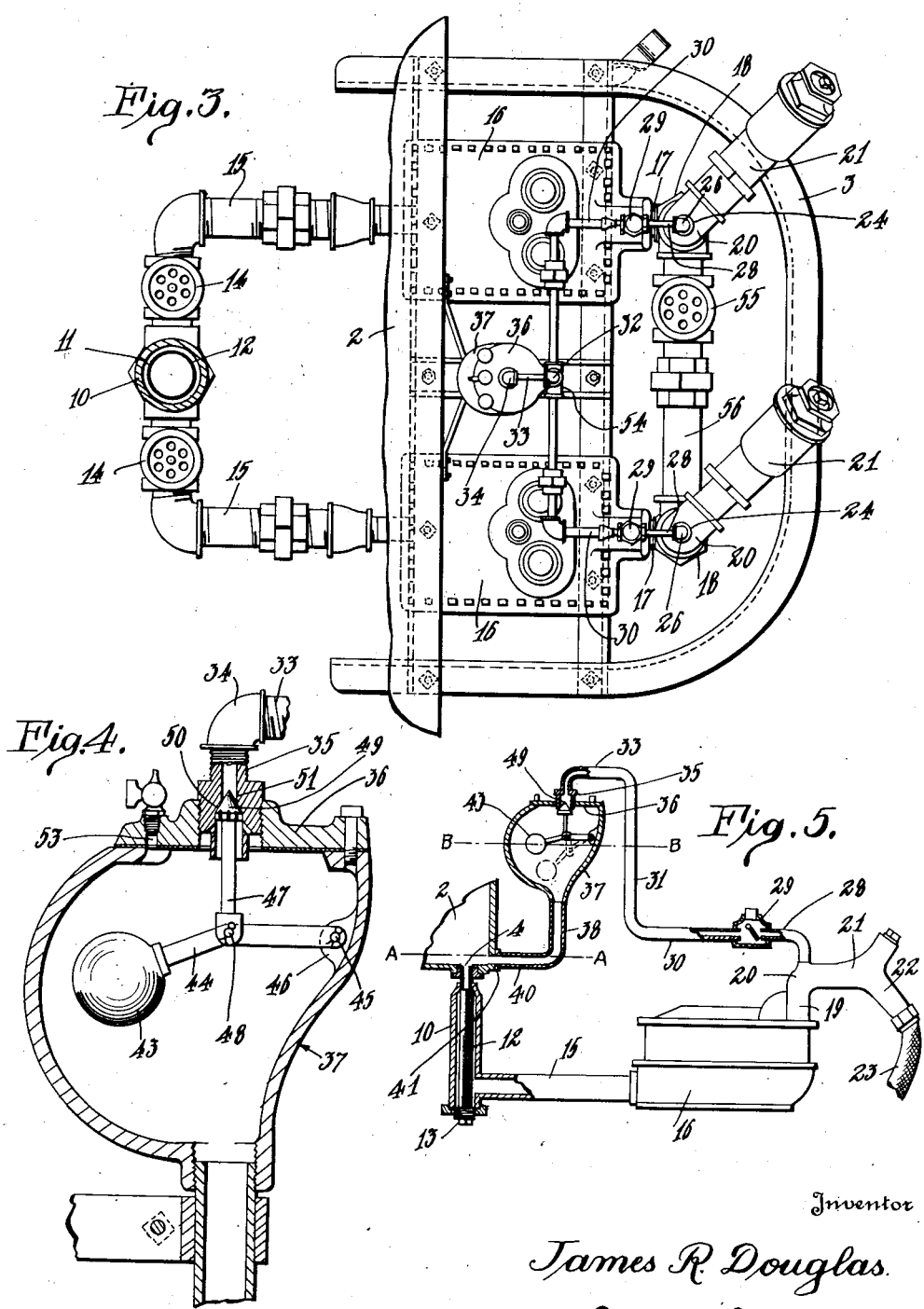

Patented Apr. 2, 1929.

1,707,657

UNITED STATES PATENT OFFICE.

JAMES R. DOUGLAS, OF SAN FRANCISCO, CALIFORNIA, ASSIGNOR, BY MESNE ASSIGN-MENTS, TO STANDARD OIL COMPANY OF CALIFORNIA, OF SAN FRANCISCO, CALIFORNIA, A CORPORATION OF DELAWARE.

LIQUID-METER DEVICE FOR TANK TRUCKS.

Application filed December 7, 1925. Serial No. 73,664.

This invention relates to liquid metering devices for tank trucks and is more particularly directed to a metering device or apparatus for use in connection with tank trucks and is so constructed and assembled as to provide an accurate liquid metering apparatus wherein means are particularly provided for eliminating "air errors" under all conditions of operation.

Accurate metering devices do not give satisfactory results when used on tank trucks or other similar installation where the tank is alternately filled and emptied unless provision is made for preventing the entrance of air into the meter. Air will enter the pipe lines when they are empty of the liquid and this air is likely to become entrapped within the meter or other parts of the discharge apparatus when the tank is refilled. This air then passes through the meter and is registered when a delivery is made and it has been found that the placing of the meter in a submerged position within the tank has practically no effect upon this cause of error.

When hose deliveries are made, it is extremely desirous that a suction or siphon delivery be had wherein a suction is exerted upon the discharge side of the meter which is dependent upon the fall in the hose. This suction is very desirable as it speeds the delivery of the liquid from the tank. However, when the tank becomes empty, this suction or siphon is sufficient to evacuate the meter of the liquid and draw into and through the meter a volume of air approximately equal to the capacity of the hose. This is a second and often a very large source of error and causes a further source of error which results from this air which is drawn into the apparatus by the siphon action as this air registers again at the initial delivery of the next load of liquid from the tank.

Another source of error which it is extremely difficult to eliminate from such metering apparatus is the air error which results from the vortex action of the discharge of the fluid from the tank and the carrying of entrained air with the liquid into the metering apparatus.

Air errors in the meter can be eliminated by never really emptying the tank but this is dependent wholly upon the care which the operator exercises in stopping the delivery at the proper point, and for that reason is not satisfactory in practice.

A primary object of this invention is to provide a metering device wherein a siphon breaker is controlled for positively eliminating the drawing of air into the meter under any and all conditions of operation and which siphon breaker is controlled solely by the head of the liquid in the supply tank.

Another object of this invention is to provide a metering device in which means are provided for reducing and practically eliminating entrained air from the liquid that is drawn from the supply tank to and through the metering devices.

Another object of this invention is to provide a metering device in which means are provided for reducing the vortex action in the supply tank.

Another object of this invention is to provide a metering device for use in connection with tank trucks, in which device means are provided for maintaining a suction head as well as a pressure head on the discharge until the supply tank is completely empty.

Another object of this invention is to provide a metering device in which means are provided for preventing the venting or spilling of vapors or liquids from the device during the discharge of the liquid from the supply tank.

Other objects and advantages of this invention will be apparent from the following detailed description of a preferred embodiment thereof, as illustrated in the accompanying drawings.

In the drawings:

Figure 3 is a top plan view of a metering apparatus embodying this invention.

Figure 4 is a sectional side elevation of a siphon breaker embodied in this invention.

Figure 5 is a diagrammatic side elevation of a metering apparatus embodied in this invention.

Figure 1:
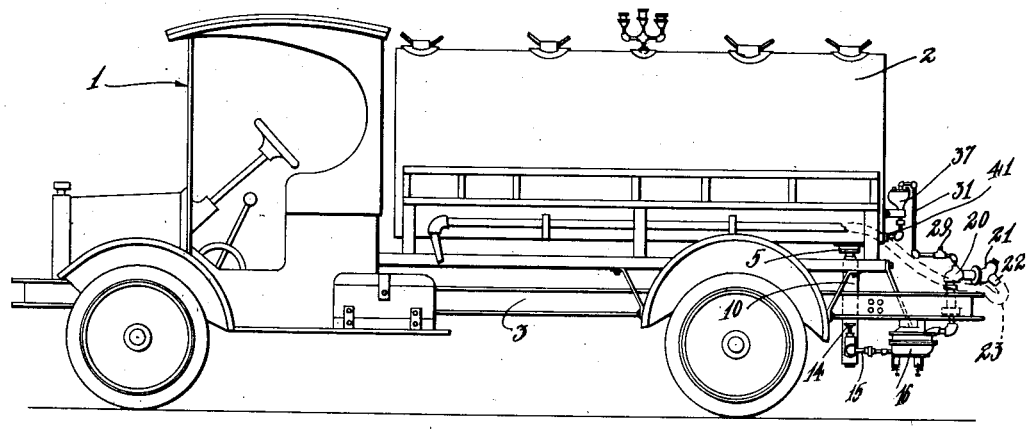
Figure 1 is a side elevation of a tank truck to which a metering apparatus embodying this invention is connected.
Figure 2:
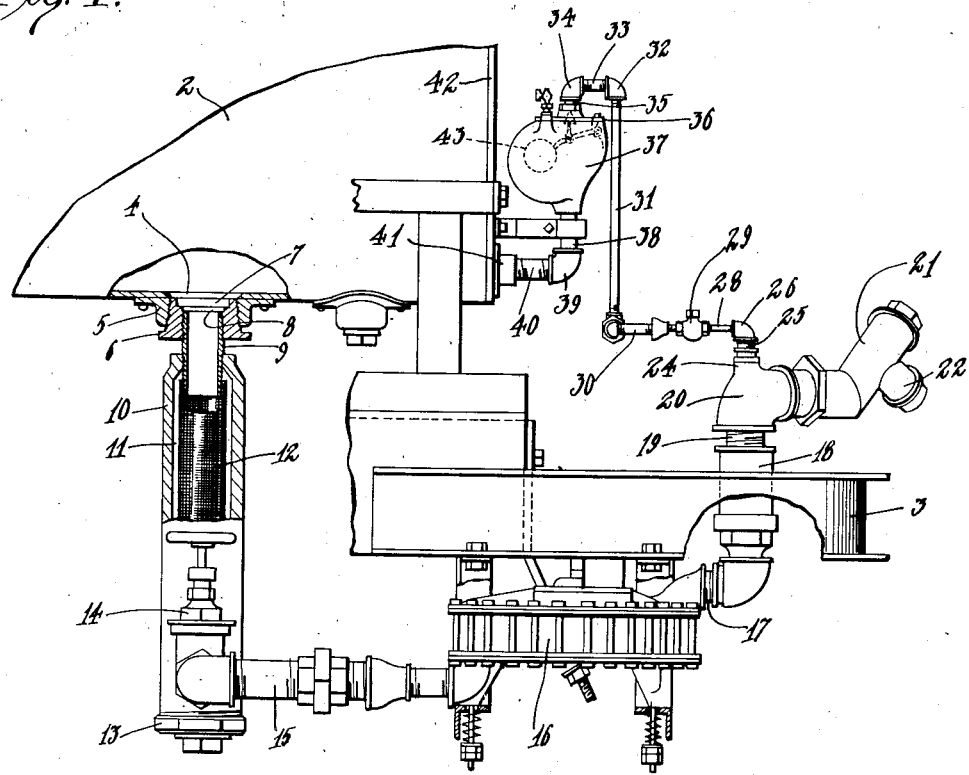
Figure 2 is an enlarged side elevation of a metering apparatus embodying this invention, illustrating the same as connected to and supported by a fragment of a motor truck vehicle and illustrating the vertical discharge pipe partly in section.

In the preferred embodiment of this invention shown in the drawings, 1 illustrates a tank truck motor vehicle of any suitable construction as is customarily employed for the purpose of delivering liquids and particularly petroleum products to their source of distribution or use. A tank 2 supported on the framework 3 of the motor vehicle may be so constructed as to comprise a plurality of independent compartments.

A discharge hole 4 is formed in the bottom of the tank 2 and a connecting flange 5 is secured around said hole to the tank 2, forming a continuation or extension thereof. Screw-threaded into the flange 5 is a bushing 6. The bushing 6 has an upper enlarged circular chamber 7 formed therein which is in direct communication with a smaller annular chamber 8 formed immediately below the chamber 7 so that the chambers 7 and 8, together with the hole 4, which is of larger diameter than the chamber 7, form a funnel-shape opening which is in comunication with the central bore or passage of a nipple 9, the nipple 9 being screw-threaded into the bushing 6. The nipple 9 is in turn screw-threaded into a tubular member 10 at the upper end of the tubular member 10. The tubular member 10 provides a vertical chamber 11 of relatively large cross-sectional area when compared with the cross-section area of the passage through the nipple 9. Screw-threaded to the end of the nipple 9, which projects into the chamber 11, is a screen or strainer 12. This screen or strainer is of fine mesh so that together with the funnel-shape outlet provided as heretofore set forth, the nipple 9 and the discharge chamber 12, the tendency of the liquid entering the hole 4 to form a vortex is very materially reduced so that the possibility of the liquid carrying entrained air with it into the strainer 12 is greatly reduced. The strainer 12 being of extremely fine mesh separates practically all of the air entrained with the liquid discharged from the tank 2 and permits the same to rise in bubbles through the nipple 10 and hole 4 back into the tank 2 when the flow is stopped or cut down to the point where the bubbles can rise against the flow so that this entrained air is not carried into the meter.

The cylindrical member 10 is capped and plugged at its lower end as illustrated at 13. Connected to the tubular member 10 at its lower end is a valve 14, which valve 14 is connected with a horizontally extending conduit 15 which connects with the meter 16. The meter 16 may be of any suitable or desirable construction, the meter illustrated in the drawings being preferably of the type known in the trade as th "Granberg meter". The meter 16 is connected to a discharge conduit 17 which connects with a vertically extending union T 18, which T 18 is secured to a nipple 19. The nipple 19 is screw-threaded at its upper end to an elbow 20, which elbow 20 is connected to the discharge nozzle 22 by any suitable means such as is illustrated at 21. A hose 23 is connected to the discharge end 22 of the nozzle 21 and extends from the nozzle 21 to any suitable point of discharge of the liquid from the tank 2 such as tanks normally located below the level of the ground so that when the nozzle 21 is open to permit the liquid to flow from the tank 2 through the hose, a suction or siphon is produced through the meter, which, together with the head of the liquid within the tank 2, aids in the discharge of the liquid from the tank 2 into the submerged tank. The employment of this suction head materially aids the speed or delivery of the liquid from the tank 2.

Means are provided for breaking this suction or siphon when the tank 2 or its relative parts are substantially drained of the liquid contained therein, which means are operated or controlled by the height of the liquid within the tank 2 and which means are preferably of the following construction:

A boss 24 is formed on the elbow 20 and into which boss 24 a nipple 25 is screw-threaded. To the upper end of the nipple 25 an elbow 26 is fitted so as to be in position to be connected with a conduit 28. The conduit 28 is screw-threaded into the body of a check-valve 29 of any suitable construction or design. The check-valve 29 is secured to a nipple 30, which nipple 30 is connected into a conduit 31 which extends vertically forward and is connected by means of an elbow 32, nipple 33, elbow 34 and connecting member 35 to the cover 36 of a siphon breaker 37. The siphon breaker 37 is connected at its lower end through a nipple 38, elbow 39 and nipple 40 to a flange 41 secured around an opening (not shown) at a low point in the end-plate 42 of the tank 2, the flange 41 being secured at a point near the bottom of the lowest level of the tank 2.

Mounted within the body of the siphon breaker 37 is a float 43, which float 43 is secured to an arm 44, which arm 44 is pivotally supported at a pin 45 at an ear 46 formed on the interior of the siphon breaker 37. A valve stem 47 is connected to the arm 44 as indicated at 48. A conical valve head 49 is secured to the upper end of the stem 47 and is adapted to seat on the seat 50 formed within the bore 51 of the connecting member 35.

In Figure 3, two of such meters 16 are illustrated as being connected to the siphon breaker 37 by means of a T 54 and a valve 55 is mounted between the T's 18 in the pipe 56 which connects the T's 18. This construction enables the use of either meter 16 or both of the meters 16 for the purpose of delivering the liquid from the tank 2. The operation of this metering device is as follows:

When the liquid in the tank 2 stands above the line A—A (see Figure 5) the float 43 is riding upon the surface of the liquid illustrated by the line B—B to maintain the valve head 49 seated. When the level of the liquid within the tank 2 drops below the level of the line A—A air is admitted through the nipple 40 into the body of the siphon breaker 37 and hence the level of the liquid within the siphon breaker 37 falls, permitting the float 43 to fall and unseat the valve head 49. The check-valve 29 opens to admit the air which is drawn into the siphon breaker 37 from the tank 2 to pass through the nipple 28 and hence into the elbow 20 and into the nozzle 22 and hose 23 breaking the siphon or suction action caused by the fall of the liquid within the hose 23. This action prevents the drawing or sucking of the liquid from within the tank 2 out of the meter 16 which is located at a point below the level A—A as will be apparent from the drawings. The discharge from the tank 2 being through the vertical discharge chamber 11 and extending to a point considerably below the level A—A, it is assured that the level of the liquid within the tank 2 will never reach the entrance point of the conduit 15 so that air will not be drawn into the meter 16. The discharge chamber 11 being vertical, it is assured that when the tank 2 is refilled, the liquid will immediately replace any air that may be in the discharge chamber 11 and will not pocket the air and will not carry the same in through the meter 16.

The check-valve 29 operates to prevent the back surge of liquid from the outlet of the meter 16 after the valve of the nozzle 21 is closed. The rate of flow of the liquid through the meter 16 under the combined head of the liquid in the tank 2 and suction of the filled hose 23 is great enough to give a considerable momentum to the mass of moving liquid and were it not for the valve 29 this momentum would carry a considerable volume of liquid through the circuit formed by the meter 16, siphon 37 and various connections. This surging liquid would, of course, register in the meter 16, whereas it has not actually been delivered through the meter 16. The prevention of surging is the sole function of the check-valve 29, other than the prevention in the two meter installations as illustrated in Figure 3 of preventing the flow of liquid from one discharge nozzle 22 to the other and the prevention of bypassing of the liquid around the meter 16 from the tank 2 to the hose 23 is accomplished by the siphon-breaker 37.

As an example of a storage tank and the operating conditions of this metering device, I have found by experiment that the smallest visible bubbles of air rise through the gasoline or liquid of the same general viscosity characteristics at a rate of about ten feet per minute. The vertical discharge chamber 11 has a diameter of approximately 8¾ inches which will permit a continuous flow of eight gallons per minute and still permit air bubbles to rise. The normal rate of flow at the end of the run is approximately thirty gallons per minute per meter or sixty gallons per minute for both meters. The velocity of the liquid would then be approximately seventy-five feet per minute. Vortex does not start normally until the siphon-breaker 37 operates. The flow is stopped from about sixty gallons per minute to about ten gallons per minute in approximately one and one-half seconds when the siphon breaker operates and then retards to no flow in less than a minute. The volume of liquid which can possibly pass through the strainer chamber 11 before the velocity of the liquid drops to eight gallons per minute is less than the volume contained in the chamber 11. In short, the operation of the siphon breaker device, which is controlled solely by the height of the liquid in the tank 2 effectually prevents the admission of air into the meter by so functioning that no air is permitted to be drawn into any pipe where it might be trapped.

Having fully described a preferred embodiment of this invention, it is to be understood that I do not wish to be limited to the details herein set forth which may obviously be varied without departing from the spirit of my invention as set forth in the appended claims.

I claim:

1. In an apparatus of the class described, the combination of a tank-truck, a tank supported on said truck, a meter, means for connecting the tank with the meter, means for siphon discharge from the meter, and siphon breaking means controlled by the height of the liquid within the tank.

2. In an apparatus of the class described, the combination of a tank-truck, a tank supported on said truck, a vertically extending discharge chamber connected to the tank, a meter, means for connecting the meter with the tank, a siphon connection connected to the outlet of the meter, a by-pass connected with the siphon discharge and with the tank, and siphon breaking means mounted in the by-pass and controlled by the height of the liquid within the tank.

3. In an apparatus of the class described, the combination of a tank-truck, a tank supported on said truck, a meter, means connecting the tank with the meter, a siphon discharge connection connected to the outlet of the meter, a by-pass connecting the siphon discharge outlet with the tank, means for preventing the discharge of the liquid from the tank through the by-pass, and siphon breaking means controlled wholly by the height of the liquid within the tank mounted within the said by-pass.

4. In an apparatus of the class described, the combination of a tank-truck, a tank supported on said truck, a vertical discharge pipe, means for connecting the discharge pipe to the tank at a point substantially at the lowest level of the tank, means for connecting the vertical discharge pipe with a meter, means for controlling the discharge from the meter, and means controlled by the height of the liquid within the tank for preventing the drawing of air through the vertical discharge pipe into the said meter.

5. In an apparatus of the class described, the combination of a tank-truck, a tank supported on said truck, means for connecting the tank to a meter, siphon means for controlling the discharge from the meter, and means controlled by the height of the liquid within the tank for breaking the siphon action created by the siphon means at a predetermined level of the liquid within the tank.

6. In an apparatus of the class described, the combination of a tank-truck, a tank supported on said truck, a meter, means for connecting the tank with the meter, siphon means connected with the discharge outlet of the meter, and means connecting the tank with the said siphon discharge means and means mounted within the said connecting means and operably controlled by the height of the liquid within the tank for breaking the siphon action obtained in the siphon discharge means for preventing the drawing of air into and through the meter.

7. In an apparatus of the class described, the combination with a motor vehicle truck of a tank mounted on said truck, means for discharging the contents of the tank, means for measuring the contents so discharged, and means connecting the discharge outlet of the measuring means and automatically controlled by the height of the liquid within the tank for breaking the siphon action of the said siphon discharge means.

8. In an apparatus of the class described, the combination of a tank-truck, a tank supported on said truck, a meter, means for connecting the tank with the meter, siphon means extending upwardly and then downwardly from the said meter, and means connected with the said siphon discharge means at a point near the upper level thereof for breaking the siphon action at a predetermined point of liquid level within the said tank.

9. In an apparatus of the class described, the combination of a tank-truck, a tank supported on said truck, means for connecting the tank with the meter, means for controlling the discharge from the tank to the meter, siphon discharge means connected to the outlet of the meter, and means for positively and automatically maintaining the meter free from air connected with the siphon discharge means and operating at a predetermined level of the liquid within the said tank for breaking the siphon action created in the said siphon discharge means.

10. In an apparatus of the class described, the combination of a tank-truck, a tank supported on said truck, a meter, means for connecting the meter with the tank, means for controlling the discharge from the tank to the meter, a siphon discharge conduit connected with the outlet of the meter, a by-pass connected with the tank and the said siphon means, and float actuated means mounted within the said by-pass and operating at a predetermined level of the liquid within the said tank for breaking the siphon created by the siphon discharge means 11. In an apparatus of the class described, the combination of a tank, a vortex reducing nipple mounted within an outlet formed at a point near the lowest level of the tank, means for connecting the vortex reducing nipple with a vertically extending discharge chamber, a meter, means for connecting the discharge pipe to the meter, means extending upward from and connected to the outlet from the meter, means for controlling the flow of liquid from the tank to the said meter, a hose connected to the discharge control means and extending to a point below the lowest level of the said meter for maintaining a siphon discharge of the contents of the tank through the said meter, and means for automatically breaking the siphon when the liquid within the tank has fallen to a predetermined level.

12. In an apparatus of the class described, the combination of a tank, a vortex reducing nipple mounted within an opening formed at substantially the lowest point of the tank, means for connecting the vortex reducing nipple with a vertically extending discharge chamber, means mounted within the vertically extending discharge chamber for segregating entrained air, a meter, means for connecting the discharge pipe to a meter, means extending upward from and connected to the outlet from the meter, means for controlling the discharge from the meter, a hose connected to the upwardly extending means and extending to a point below the lowest level of the said meter for maintaining a siphon discharge of the contents of the tank through the said meter, and means controlled by the height of the liquid within the tank for automatically breaking the siphon when the liquid within the tank has fallen to a predetermined level.

13. In an apparatus of the class described, the combination of a tank-truck, a tank supported on said truck, a meter, means connecting the tank with the meter, means connected with the outlet of the meter for maintaining a siphon discharge of the contents of the tank through the said meter, and means connected with the tank and with the said outlet connection for breaking the siphon action when the liquid within the tank has fallen to a predetermined level.

14. In an apparatus of the class described, the combination of a tank, a vortex reducing nipple mounted in an opening at substantially the lowest point in the tank, a vertically extending discharge chamber, means connecting the vertically extending discharge chamber with the vortex reducing nipple, means mounted within the vertically extending discharge chamber for segregating entrained air, a meter, means connecting the vertical discharge chamber with the meter, siphon discharge means connected with the outlet of the meter, and siphon breaking means connected to the tank and to the siphon discharge means and operable at a predetermined liquid level of the liquid within the tank for breaking the siphon action when the liquid within the tank has fallen to the said predetermined level.

15. In an apparatus of the class described, the combination of a tank-truck, a tank supported on said truck, a meter, means connecting the meter and the tank, means connected with the outlet of the meter for maintaining a siphon discharge of the liquid from the tank through the said meter, means for controlling the siphon discharge, a bypass connecting the tank around the meter with the said siphon maintaining means, a siphon breaker mounted in the said bypass, and a check-valve mounted in the said bypass to prevent surging of the liquid when the said discharge is stopped.

16. In an apparatus of the class described, the combination of a tank-truck, a tank supported on said truck, a meter, means connecting the tank with the meter, means for siphon discharge from the meter, siphon breaking means controlled by the height of the liquid within the tank, and means for stopping surging of the liquid through the meter when the discharge of the liquid is stopped.

Signed at San Francisco this 30th day of November, 1925.

JAMES R. DOUGLAS.